Oct. 19, 1937.                L. M. FRANCIS                 2,096,455
                           VEHICLE CONSTRUCTION
                         Filed Sept. 16, 1933          2 Sheets-Sheet 2

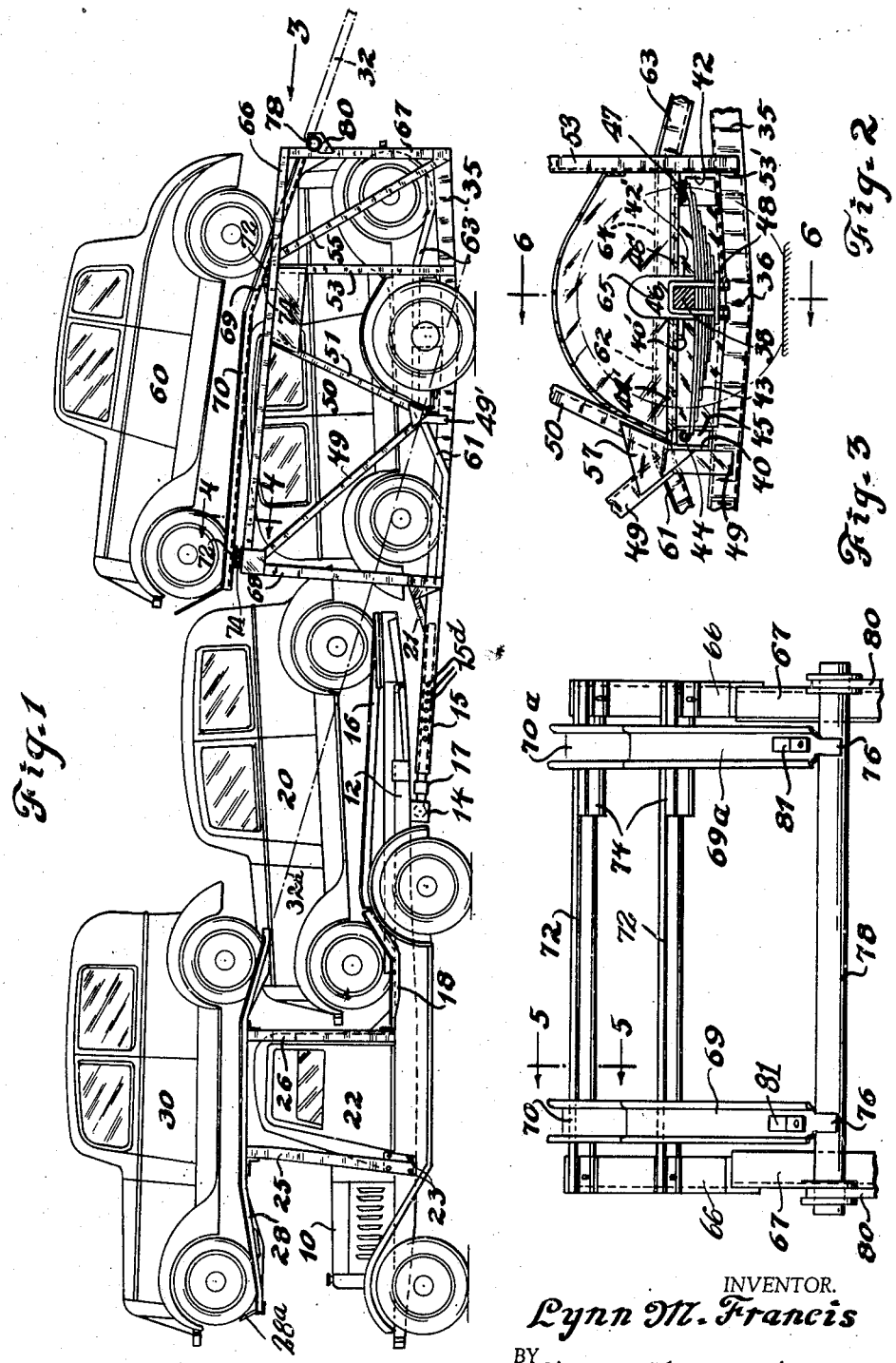

INVENTOR.
Lynn M. Francis
BY Swan, Frye & Hardesty
ATTORNEYS

Patented Oct. 19, 1937

2,096,455

UNITED STATES PATENT OFFICE 2,096,455

VEHICLE CONSTRUCTION

Lynn M. Francis, Birmingham, Mich., assignor to Mechanical Handling Systems, Inc., Detroit, Mich., a corporation of Michigan Application September 16, 1933, Serial No. 689,712

9 Claims. (Cl. 280—33.1)

This invention relates to vehicle construction and more particularly to improvements in freight-hauling vehicles of the sort especially adapted to the transporting of completed motor cars. An important object of the invention is the provision of improved trucking means including cooperating tractor and trailer portions, enabling the safe transportation of a greater number of finished motor cars by means of apparatus consuming less highway space than has heretofore been required for the transportation of equivalent loads.

As is well known, statutes and highway regulations in many jurisdictions limit the dimensions of vehicles which may be operated on the highways, and in many jurisdictions such limitations are now so narrowed that it has been found impossible to carry more than three motor cars by means of a single truck and trailer assembly, or equivalent apparatus, of permissible dimensions.

An important object of this invention, therefore, is the provision of motor transporting equipment of an extremely compact nature, so designed that the motor cars constituting the load may be arranged thereupon in an unusually compact, interfitting and novel manner, calculated to increase the number of cars which may be carried with apparatus of given dimensions.

Another object of the invention is the provision of such conveying equipment including articulated tractor and trailer portions detachable and usable separately, and the tractor portion of which is usable as a truck to efficiently transport a lesser load when used without the trailer.

A further object is the provision of such an automotive transport so constructed that portions of cars loaded thereon may overlie one another, but that the overall height of the hauling equipment and load may be kept within desired limits.

Still another object is the provision of an improved running gear and spring suspension for such vehicles.

Other objects include the provision of novel reinforcing and bracing means incorporating an improved arrangement of girders, improved track construction providing runways and supports for transported cars, and novel hinged track portions for upper cars, movable into and out of an obstructing position relatively to lower cars, as well as the incorporation of an improved adjustable draw-bar construction.

Other objects and advantages will be apparent from the following description, wherein reference is made to the accompanying drawings illustrating preferred embodiments of my invention, and wherein similar reference numerals designate similar parts throughout the several views.

In the drawings:

Figure 1 is a side elevational view of a loaded and coupled truck and trailer assembly incorporating the principles of this invention;

Figure 2 is a detail partly in section and partly in side elevation showing a portion of the running gear and spring suspension of the trailer portion, a wheel being removed to afford a better view of certain parts;

Figure 3 is a rear elevational view of the upper portion of the trailer, unloaded;

Figure 5:
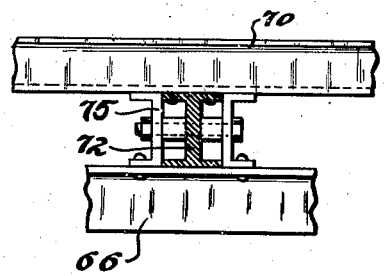
Figure 5 is a detail section taken substantially on line 5—5 of Figure 3, and looking in the direction of the arrows.

Referring now to the drawings: reference character 10 designates generally a motor truck, the frame 12 of which is elongated rearwardly and carries beneath its overhanging rear portion a coupling 14, to which is adapted to be secured, in a manner presently to be described in greater detail, the drawbar, as 15, of a trailer.

The rearwardly projecting platform formed by the frame 12 of the truck carries tracks 16 suitably spaced to receive and serve as supports and runways for the wheels of a motor car to be transported. A depressed front track section 18 forming a continuation of the track 16 permits a car, as 20, carried thereby, to incline downwardly toward the front, and the opposite inclinations of the track sections 16—18 assist in centering the car and tend to prevent its rolling in either direction.

The truck shown is provided with a driver's cab 22, at the corners of which and secured to the frame 12, as by rivets 23, are upright columns 25—26, carrying at their tops longitudinal tracks as 28 having downwardly inclined front and rear end portions. A buffer member, as 28a, may guard the front of each track, and these tracks are also adapted to receive and support another vehicle, as 30, the rear wheels of which overlie the hood portions of the lower car 20 carried by tracks 16—18, when the truck is loaded in the manner shown.

In loading the cars upon the truck, the upper car 30 is of course loaded first, suitable loading tracks or runways being temporarily connected to the rear ends of tracks 28 to permit running the car up the loading runways and onto the upper tracks, as indicated at 32a in dot-dash lines in Figure 1. After the runways have been so used in loading car 30 on the upper tracks, they may be similarly connected to the rear ends of track sections 16 so that the lower car, as 20, may be run upon the lower tracks and arranged in the position shown. It will be seen that by virtue of this arrangement one of the carried cars, as 30, extends forwardly as far as do the front portions of the truck, while the hood portion of the lower car 20 fits under the rear portion of the upper, and its higher body portion projects rearwardly, such disposition of the load enabling a most economical use of space.

The trailer portion may comprise a framework of beams and girders arranged to reinforce one another and support the load in a manner clearly shown in the drawings. The side frame members 35 may be formed of inwardly opening channel irons having dropped centers, being bent upwardly toward their ends about a transverse line beneath and parallel to the axle 38, as indicated at 36. The frame members pass beneath the axle, and cross bracing channel irons 40—42 are arranged across the tops of the frame members on opposite sides of and substantially parallel to the axle. The cross bracing channel irons 40—42 have their flanges oppositely disposed and inwardly projecting toward the axle, as clearly shown in Figure 2, and are also adapted to support the semi-elliptic springs 43, which are pivoted at one end, as at 44, on a plate 45 secured in and transversely of channel iron 40. The other end of the spring may bear upwardly against, but otherwise be unsecured to, the inside of the upper flange of rear channel iron 42, or a hardened bearing plate as 47 inserted in the channel. The spring is centrally shackled to the axle 38, as by U bolts 46 and straps 48.

Angularly upwardly projecting girders as 49—51—53—55 are secured to the frame members 35 at spaced points therealong, and to each other; riveted or welded downward extensions thereof, as 49'—53', and suitable gusset plates as 57 being provided to facilitate their securing.

Figure 6:
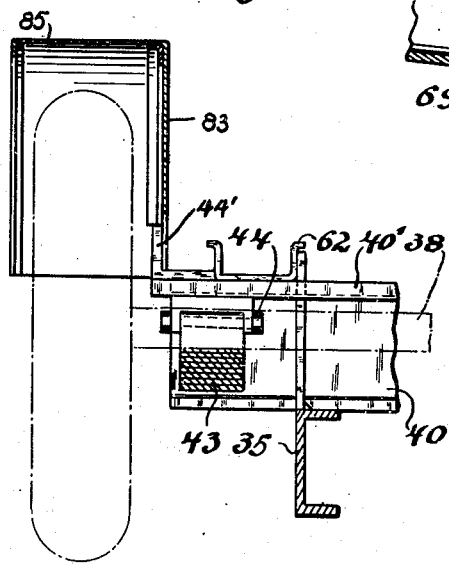
Figure 6 is a detail section taken substantially on the line 6—6 of Figure 2 and looking in the direction of the arrows.

Combined track and girder members as 61—62—63—64 serving as supports and providing a runway for a car to be carried are affixed to both the bracing girders and frame members, lying close to the frame but centrally elevated to clear the springs (Figures 2 and 6). The central elevated track sections 62—64 are not raised sufficiently to entirely clear the path of vertical movement of the axle under possible springing movement thereof, and a gap 65 is accordingly left between such sections and in vertical alignment with the axle, in which gap the axle may move. The horizontal elevated track sections 62—64 between which the gap 65 is left are supported by girder plates welded along their upper edges to such track sections and along their lower edges to the frame members 36, as best shown in Figure 6. Additional reinforcement is provided by the cross braces 40'—42' extending across and beneath the ends of the track sections. Angle irons as 44'—46' extend parallel to and directly outside the track sections 62—64, and are preferably welded thereto, as well as to the cross braces 40—40', 42—42'. Shield plates 83 are secured to and project upwardly from the angle irons and form the inner or splash shield parts of mudguards 85. The plates 83 are cut away in alignment with the gap 65 to permit axle movement.

This gap between the centrally elevated track sections 62—64 is not so great as to interfere with running the wheels of a car thereover, being only slightly wider than the axle.

The longitudinally arranged top side rails 66 of the frame will be seen to be somewhat lower than the top of a car (50) carried by the lower track sections 61—62—63—64 just described. The rails 66 are secured to the tops of the bracing girders 49—51—53—55 and corner posts 67—68.

Also supported by the upper portion of the framework are longitudinally extending upper tracks formed in angularly arranged rear and front sections designated 69—70, 69a—70a. The rear track sections 69—69a incline downwardly quite sharply and extend to a point lower than the top of a car carried by the lower tracks, occupying the space between the top and hood of a lower car, (50) as shown in Figure 1. The front and rear track sections, which may be integral, are hingedly connected to the top side rails 66, and swingable from the lowered position in which they are shown in Figure 1 to a raised position of non-interference with movement of cars on and off the lower tracks. The hinging arrangement is best shown in Figures 3–5.

Figure 4:
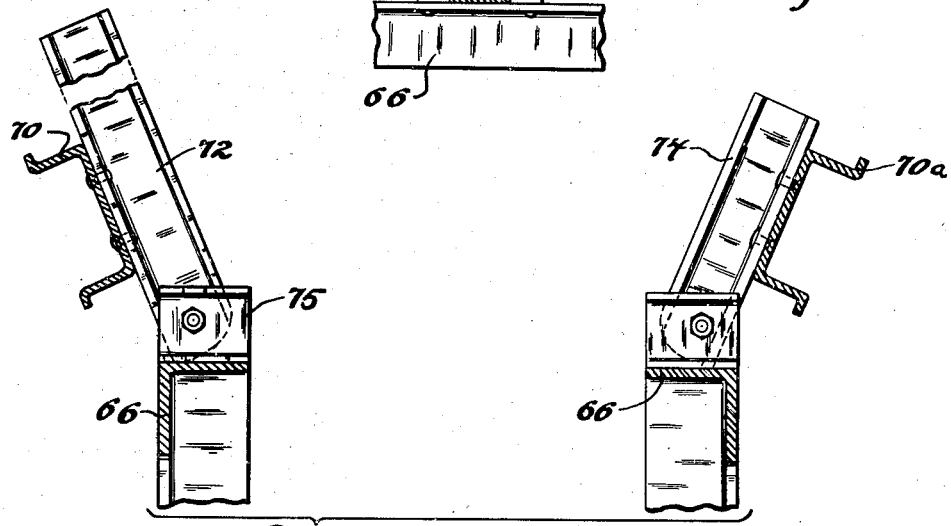
Figure 4 is a detail vertical section taken substantially on the line 4—4 of Figure 1 and looking in the direction of the arrows.

Transverse hinge and supporting rails, shown as I-beams 72, carry the upper track section 69—70 of one side, shown as the left in Figures 3 and 4, the rails 72 being pivoted to the adjacent top side rail 66, as in brackets 75, and adapted when lowered to engage at their ends the opposite side rail 66, on the top of which they rest to support the track sections. The opposite track members, here shown as those on the right side, and designated 69a—70a, are carried by shorter hinge bars 74, similarly pivoted on the right top side rail. Thus the bars 72 serve as beams and support both track assemblies, always being lowered first and extending across the tops of both rails 66, while the right hand track assembly, being lowered last, also rests on the rails 72, the shorter bars 74 serving merely as hinges.

Figure 7:
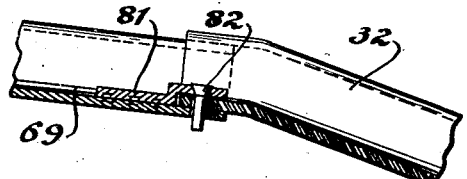
Figure 7 is a detail longitudinal section of the securing means for the loading runways, fragmentarily showing one of such runways and a track portion of one of the vehicles.

At their lower rear extremities the inclined rear sections 69—69a of the upper track assemblies are provided with integral down-turned lips, as 76, adapted to rest upon a transverse bracing member in the form of a pipe 78, which may be removably positioned across and in brackets 80 carried by the rear corner posts 67. It will be seen that when the tracks are swung upwardly as indicated in Figure 4, the downwardly inclined rear sections 69—69a of the upper tracks, and their terminal lips 76, are free of the pipe 78, which then may be removed by merely lifting it from the brackets to permit movement of the lower car, as 50, on or off the trailer, which movement, by reason of their low positioning, both the pipe and the track sections 69—69a block when in place and lowered. Near their rear ends and inside the same the track sections 69—69a are also provided with coupling members, as 81, shown as perforated brackets, to which the loading and unloading tracks or runways members 32 may be temporarily coupled in the manner best shown in Figure 7, as by being fitted into the ends of track sections 69—69a and beneath the bracket members 81, to which they may be secured as by means of pins 82 extending through the bracket and both tracks. Similar coupling means (unshown) may be provided for securing the same or other runways to the rear extremities of the other track sections carried by the truck and trailer and previously described.

It will be seen that aside from the movable tracks, and removable bracing member 78, there are no cross members extending into the space between the sides of the trailer to prevent movement of cars therethrough. It is accordingly possible to load and unload the tractor-truck without uncoupling the trailer, the temporary runway members being merely extended through the trailer and coupled to the truck tracks, as indicated in dot-dash lines at 32a in Figure 1.

It will be seen that in loading the trailer, the upper tracks are first swung upward and out of the way, whereupon the car, as 50, to be placed upon the lower tracks, may be run thereonto, after which the pipe-like bracing member 78 is positioned in brackets 80 and the upper tracks lowered into position, first those (69—70) carried by the hinged supports 72 and then those (69a—70a) carried by hinge bars 74. The upper car, as 60, may then be hauled or run up the runway members 32 and onto the upper tracks. All of the cars may be additionally locked in place by chaining or shackling in any suitable manner.

Figure 8:
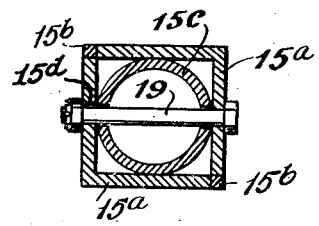
Figure 8 is a transverse section of the drawbar.

In order to enable adjustment of the overall length of the tractor and trailer assembly, the drawbar, generally designated 15, is preferably adjustable in length. In the construction shown in Figures 1 and 8, a pair of angle irons 15a are oppositely arranged edge to edge to form a rigid bar of hollow square section, the edges being welded or otherwise suitably secured together, as at 15b. A hollow drawbar, as 15c, forms a continuation of and is slidable in the bar 15, and carries on its projecting end a coupling member, as 17, securable to the coupling member 14 carried by and beneath the frame of the tractor. A plurality of registrable transverse holes as 15d extend through both drawbar sections 15—15c, and a bolt, as 19, enables securing the extensible section 15c in any of several positions relatively to the rigid bar formed by angle irons 15a. Such bar is secured to the trailer frame in any suitable manner, being in the construction here shown welded thereto and braced by the angular member 21.

Although more cars than ordinarily possible may thus be hauled by means of equipment of restricted length, the total height is not increased, and the load is so balanced and distributed that the assembly is very stable and more easily controlled on the road than many less compact constructions. The flexibility of the equipment is also enhanced by the ease with which the tractor portion may be used separately for the transportation of two cars only, by means of apparatus of even lesser length and easier manipulation. A great saving is thus effected when less than a full load is to be carried—as is frequently the case, quite aside from the advantageousness of having available very small and compact equipment when desired.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

I claim:

1. In a wheeled conveyance for automobiles and the like, a frame having opposite side portions, longitudinally extending lower track portions carried by and near the bottom of the frame for supporting an automobile to be carried, a pair of longitudinally extending upper track members spaced above the lower track members for supporting another automobile to be carried above the first automobile, means pivotally connecting the upper track members to opposite sides of the frame, including a plurality of combined hinge and crossbar members certain of which are pivotally affixed to one side of the frame near its top and when in operative position extend entirely across and to the opposite side of the same, one track of said pair being attached to said members near their hinged ends, shorter hinge members pivotally secured to the opposite side of the frame and carrying the other track of said pair and so arranged that the track carried thereby may be swung down into supported engagement with said combined hinge and crossbar members, whereby said track members may be swung upwardly and farther from the lower track portions, and may be moved downwardly to a position in which said combined hinge and crossbar members extend across the top of the frame, and both tracks of said pair extend over the tops of said bars.

2. In a conveyance for motorcars and the like, a frame, combined supporting track and runway members extending longitudinally of and carried by the frame near the bottom thereof, a pair of upper combined track and supporting members vertically spaced above the first, and means independently hingedly supporting said upper tracks, including combined hinge and crossbar members pivoted to one side of the frame and carrying one track of said pair, said bars being of such length as to extend completely across the top of the frame when swung to lowered position, and shorter hinge bars carrying the other track of said pair and offset relatively to the first mentioned bars whereby the track carried thereby may be swung down into supported engagement with said combined hinge and crossbar members.

3. In a wheeled conveyance for transporting automobiles, a trailer section having substantially vertically aligned superposed supports one of which supports projects toward the other at one extremity to permit the disposition of automobiles thereupon in oppositely facing partially interfitted relation to reduce the overall height of the loaded trailer, and a tractor portion articulated to the trailer section and having a rearwardly extending support arranged at a level between the levels of the superposed trailer supports, whereby an automobile carried by said rearwardly extending support of the tractor portion may partially project between portions of the automobiles carried by the superposed trailer supports to reduce the overall length of the articulated tractor and trailer.

4. Conveying means for automobiles and the like comprising a plurality of wheeled sections longitudinally movable relatively to each other, spacedly superposed load supports carried by one of said sections, a load support carried by an adjoining section and projecting toward the space between and arranged at a level intermediate said superposed load supports, and adjustable connecting means for maintaining said sections in any of variantly spaced longitudinal relations, whereby an automobile carried by said rearwardly projecting support may project between portions of the automobiles carried by said superposed supports, and whereby automobiles of different dimensions may be so accommodated with the minimum of consumption of space by said sections by adjustment of said connecting means.

5. Conveying means for automobiles and the like comprising a plurality of wheeled sections longitudinally movable relatively to each other, spacedly superposed load supports carried by one of said sections, a load support carried by an adjoining section and projecting toward and arranged at a level intermediate said superposed supports, an adjustable draft element for articulating said sections in any of variantly spaced longitudinal relations, whereby an automobile carried by said rearwardly projecting support may extend between a portion of the automobiles carried by said superposed supports, and whereby automobiles of different dimensions may be so accommodated with the minimum of consumption of space by said sections by adjusting the connecting means.

6. In a conveyance for automobiles and the like, a frame having spaced side portions, vertically spaced upper and lower supporting means carried by the frame, the upper of said supporting means having a portion rigid with the remainder thereof projecting toward and lying closer to the lower supporting means in a vertical line than other portions thereof, and means including hinged beam members pivoted to one of the side portions of the frame and extending across to the other side portion when in one position and hingedly supporting the entire upper supporting means for swinging movement about a longitudinal axis whereby it may be moved farther from the lower supporting means at will, to move said projecting portions out of interfering relation to the lower supporting means.

7. In a wheeled conveyance for automobiles and the like, a frame, longitudinally extending lower track portions carried by and near the bottom of the frame for supporting an automobile to be carried, a pair of longitudinally extending upper track portions spaced above the lower track portions for supporting another automobile to be carried above the first automobile, said upper track portions being of rigid construction and extending substantially the full length of the frame, and portions thereof being bent downwardly out of a flat plane to such extent that when in operative position they prevent running an automobile onto the lower track portions, means pivotally connecting each upper track portion to the frame, including bars carrying one of said pair of upper tracks and extending transversely the full width of the frame and pivotally attached to one side thereof but supportable by both sides when in one position, and hinge bars independently connected to the other track of said pair and offset from said first mentioned bars whereby said other track may be lowered into supported engagement with said first mentioned bars.

8. In a wheeled conveyance for automobiles and the like, a frame, longitudinally extending lower tracks carried by and near the bottom of the frame for supporting an automobile to be carried, a pair of longitudinally extending upper tracks spaced above the lower tracks for supporting another automobile to be carried above the first automobile, said upper tracks being of rigid construction and extending substantially the full length of the frame, and portions thereof being bent downwardly out of a flat plane to such extent that when in operative position said portions interfere with running an automobile onto the lower tracks, and means pivotally connecting each of said upper tracks to and near the top of the frame upon opposite sides thereof for swinging movement about longitudinal axes substantially parallel to the lower tracks but offset from the vertical planes in which said lower tracks lie, the pivotal connecting means being of such length that the upper tracks when in operative position lie in the vertical planes occupied by the lower tracks, whereby each upper track may be swung as a unit to move said downwardly bent portions out of the interfering position while simultaneously moving the entire upper track.

9. In a wheeled conveyance for motor cars and the like, in combination with a frame, a superstructure carried thereby comprising a pair of transversely spaced side frames each terminating at its upper end in a longitudinally extending frame member, a pair of transversely spaced vehicle supporting tracks pivotally secured to said longitudinal frame members for movement to and from an operative position, and transversely extending beam members bridging the space between and resting upon said longitudinal frame members and forming therewith a rigid support for both of said track members when the latter are in operative position, at least one of said tracks being movable independently of said beam members.

LYNN M. FRANCIS.